United States Patent
Sutedja et al.

(10) Patent No.: US 8,676,166 B2
(45) Date of Patent: Mar. 18, 2014

(54) METHOD, SYSTEM AND APPARATUS FOR MANAGING MESSAGES AT A MOBILE ELECTRONIC DEVICE

(75) Inventors: Darsono Sutedja, Hudson, NH (US); Umesh Miglani, North Chelmsford, MA (US)

(73) Assignee: BlackBerry Limited, Waterloo (CA)

( * ) Notice: Subject to any disclaimer, the term of this patent is extended or adjusted under 35 U.S.C. 154(b) by 62 days.

(21) Appl. No.: 13/554,707

(22) Filed: Jul. 20, 2012

(65) Prior Publication Data
US 2013/0029642 A1     Jan. 31, 2013

Related U.S. Application Data

(60) Provisional application No. 61/513,077, filed on Jul. 29, 2011.

(51) Int. Cl.
*H04L 12/58*  (2006.01)
*G06F 15/16*  (2006.01)

(52) U.S. Cl.
USPC ........................................ 455/412.1; 709/206

(58) Field of Classification Search
USPC ................. 455/26.1, 3.01, 2.01, 400, 39, 73; 709/201, 223, 249, 204, 227, 238
See application file for complete search history.

(56) References Cited

U.S. PATENT DOCUMENTS

| | | | |
|---|---|---|---|
| 7,551,663 B1 * | 6/2009 | Proctor, Jr. ................... | 375/147 |
| 2006/0111086 A1 | 5/2006 | Wilson et al. | |
| 2012/0215861 A1 * | 8/2012 | Smith et al. ................... | 709/206 |

FOREIGN PATENT DOCUMENTS

| | | |
|---|---|---|
| EP | 1248422 A1 | 10/2002 |
| WO | 0228127 A1 | 4/2002 |
| WO | 02099651 A1 | 12/2002 |

OTHER PUBLICATIONS

Changing the default view of the messages list to show only enterprise messages from the inbox that have been redirected by a BlackBerry Enterprise Server. http://www.besadmin.info/KB10395/Changing-the-default-view-of-the-messages-list-to-show-only-enterprise-messages-from-the-Inbox-that-have-been-redirected-by-a-BlackBerry-Enterprise-Server; modified date: Aug. 21, 2009 and retrieved on Sep. 6, 2012.

(Continued)

*Primary Examiner* — Kwasi Karikari
*Assistant Examiner* — Emem Stephen
(74) *Attorney, Agent, or Firm* — Novak Druce Connolly Bove + Quigg LLP (57) ABSTRACT

According to embodiments described in the specification, a method, system and apparatus for managing messages at a mobile electronic device is provided. The method comprises: receiving a message and storing the message in a memory of the mobile electronic device; determining, at a processor of the mobile electronic device, if the message passes at least one filter criterion maintained in the memory, the filter criterion for use in generating a primary message view; when the message does not pass the filter criterion, adding a device-side label to the message; generating the primary message view according to the filter criterion; detecting an interaction with the message; and in response to detecting the interaction, automatically removing the device-side label from the message.

17 Claims, 10 Drawing Sheets

(56) References Cited

OTHER PUBLICATIONS

Hiding Junk Email—http://www.blackberryforums.com/rim-software/84108-hiding-junk-email.html#post589280; published on Jul. 3, 2007 and retrieved on Sep. 6, 2012.

Hide Filed Messages"sort-of" working—http://forums.crackberry.com/general-discussion-f2/hide-filed-messages-sort-working-35123/; published on May 12, 2008 and retrieved on Sep. 6, 2012.
Extended European Search report mailed Nov. 26, 2012, in corresponding European patent application No. 12177957.3.

* cited by examiner

METHOD, SYSTEM AND APPARATUS FOR MANAGING MESSAGES AT A MOBILE ELECTRONIC DEVICE

CROSS-REFERENCE TO RELATED APPLICATION

This application claims priority from U.S. Provisional Application No. 61/513,077, the contents of which is incorporated herein by reference.

FIELD

The specification relates generally to messaging, and specifically to a method, system and apparatus for managing messages at a mobile electronic device.

BACKGROUND

As mobile electronic devices such as smartphones continue to become more common, the capabilities of such devices continues to grow. However, the resources of mobile devices—display area, storage capacity, computational power and the like—remain limited in comparison with their mains-powered desktop counterparts. The limitations of mobile devices become apparent in various areas, including mobile devices' handling of email messages.

Some email accounts are organized on mail servers in folder structures: each email is assigned to a folder in the mail server, whether a default folder or other, non-default folders, according to rules. Assigning an email to a non-default folder can result in the message being partially hidden when the email account is viewed on a desktop computer with a large display. For example, rather than the sender and subject of the email being visible, only an indication that a new message has been received may be provided. However, some mobile devices do not implement the folder structures locally in order to conserve resources, and cannot display partially hidden messages, instead hiding such messages entirely due to their reduced display areas.

To remedy the above issues, in some email systems, an intermediate server between the mail server and the mobile device examines an email and marks the email as being "filed" when the email has been assigned to a non-default folder on the mail server, and "unfiled" otherwise. The marking can be done with a flag having two states. The mobile device is then configured to examine the flag as received from the intermediate server, and to display messages that are marked "unfiled", as well as unread messages that are marked "filed".

BRIEF DESCRIPTIONS OF THE DRAWINGS

Embodiments are described with reference to the following figures, in which.

DETAILED DESCRIPTION OF THE EMBODIMENTS

According to non-limiting aspects of the specification, a method is provided for managing messages at a mobile electronic device, comprising: receiving a message and storing the message in a memory of the mobile electronic device; determining, at a processor of the mobile electronic device, if the message passes at least one filter criterion maintained in the memory, the filter criterion for use in generating a primary message view; when the message does not pass the filter criterion, adding a device-side label to the message; generating the primary message view according to the filter criterion; detecting an interaction with the message; and in response to detecting the interaction, automatically removing the device-side label from the message.

According to further non-limiting aspects of the specification, a non-transitory computer readable medium is provided for storing computer-readable instructions executable by a processor of a mobile electronic device, the instructions for causing the computing device to perform the method.

According to other non-limiting aspects of the specification, a mobile electronic device is provided, comprising: a communications interface for receiving a message; a memory interconnected with the communications interface for storing the message; a processor interconnected with the communications interface and the memory, the processor configured to determine if the message passes at least one filter criterion maintained in the memory, the filter criterion for use in generating a primary message view on a display of the mobile electronic device; the processor further configured, when the message does not pass the filter criterion, to add a device-side label to the message; the processor further configured to control the display for generating the primary message view according to the filter criterion; the processor further configured to detect an interaction with the message; and, in response to detecting the interaction, to automatically remove the device-side label from the message.

Figure 1:
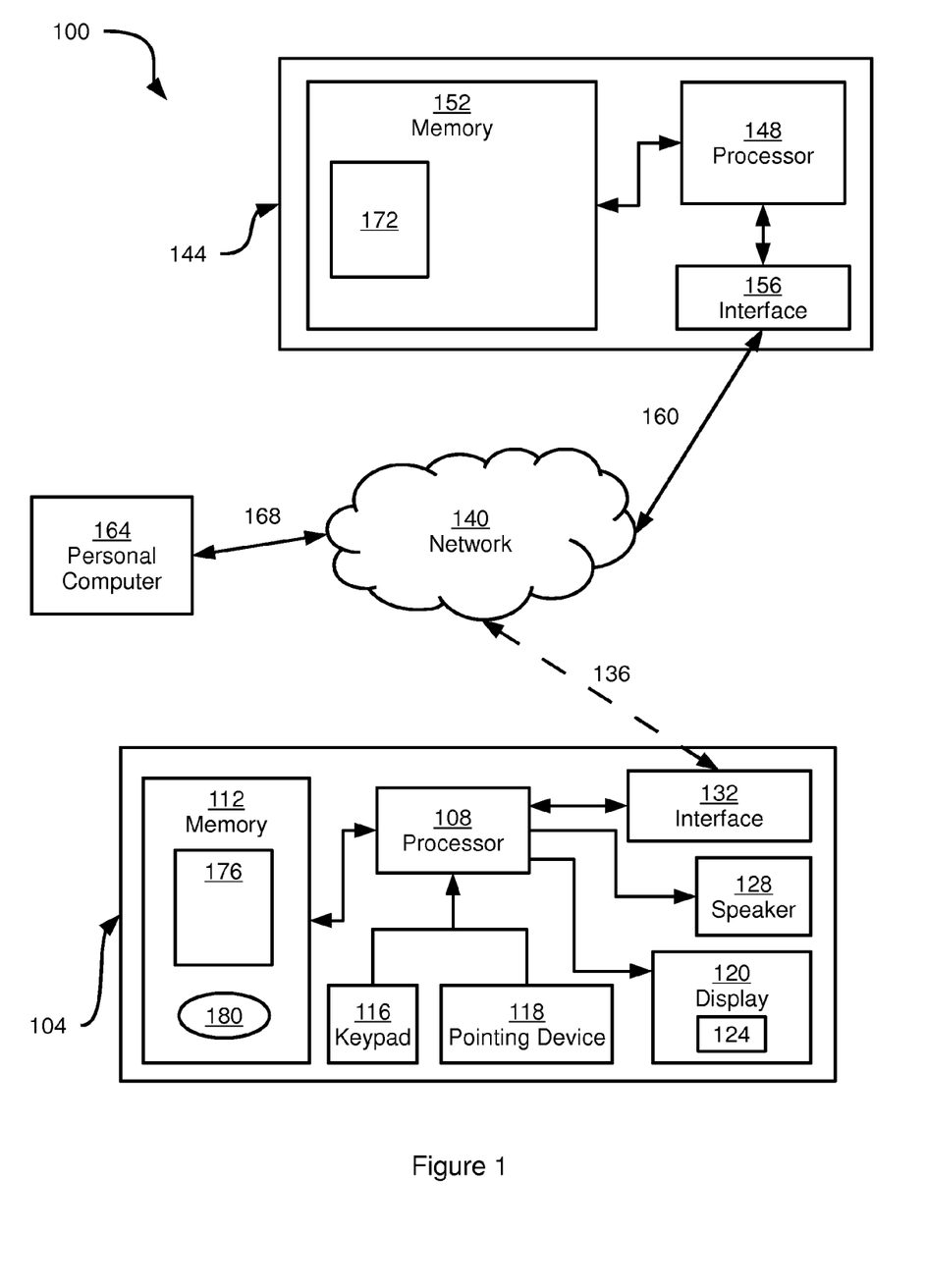
FIG. 1 depicts a system for managing messages, according to a non-limiting embodiment.

FIG. 1 depicts a communications system 100. System 100 includes a mobile electronic device 104, which in the present example is based on the computing environment and functionality of a hand-held wireless communication device, such as a smartphone. Mobile electronic device 104 is not limited to such a hand-held wireless communication device, however. Other computing devices are also contemplated, such as cellular telephones (also referred to as "feature phones"), Personal Digital Assistants ("PDAs"), media (e.g. MP3) players, laptop computers, tablet computers and the like.

Mobile electronic device 104 includes a processor 108 interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device) memory. In the present example, memory 112 includes both a non-volatile memory for persistent storage of computer-readable instructions and other data, and a non-volatile memory for short-term storage of such computer-readable instructions and other data during the execution of the computer-readable instructions. Other types of computer readable storage medium external to mobile electronic device 104 are also contemplated, such as secure digital (SD) cards and variants thereof. Other examples of external computer readable storage media include compact discs (CD-ROM, CD-RW), digital video discs (DVD) and other optical discs.

Mobile electronic device 104 also includes one or more input devices interconnected with processor 108. Such input devices are configured to receive input and provide data representative of such input to processor 108. Input devices can include, for example, a keypad 116 and a pointing device 118. Thus, keypad 116 can receive input in the form of the depression of one or more keys, and can then provide data representative of such input to processor 108. The data provided to processor 108 can be, for example, an American Standard Code for Information Interchange (ASCII) value for each of the depressed keys. Keypad 116 can be a full QWERTY keypad, a reduced QWERTY keypad or any other suitable arrangement of keys. Pointing device 118 can be implemented as a track ball, track wheel, touch pad, touchscreen, or any suitable combination thereof.

In some examples, mobile electronic device 104 can include additional input devices in the form of one or more additional buttons, light sensors, microphones and the like (not shown). More generally, any suitable combination of the above-mentioned input devices can be incorporated into mobile electronic device 104.

Mobile electronic device 104 further includes one or more output devices. The output devices of mobile electronic device 104 include a display 120. Display 120 includes display circuitry 124 controllable by processor 108 for generating representations of data and/or applications (that is, collections of computer readable instructions) maintained in memory 112. Display 120 includes a flat panel display comprising any one of, or any suitable combination of, a Liquid Crystal Display (LCD), a plasma display, an Organic Light Emitting Diode (OLED) display, and the like. Circuitry 124 can thus include any suitable combination of display buffers, transistors, LCD cells, plasma cells, phosphors, LEDs and the like. When pointing device 118 includes a touchscreen, the touchscreen can be integrated with display 120, for example as capacitive or resistive layers superimposed on display 120.

The output devices of mobile electronic device 104 can also include a speaker 128 interconnected with processor 108. Additional output devices are also contemplated, including, for example, a light-emitting indicator (not shown) in the form of a light emitting diode (LED), and a motor or other mechanical output device (not shown) for causing mobile electronic device 104 to vibrate. In general, mobile electronic device 104 can include any suitable combination of the above-mentioned output devices, and may also include other output devices.

Mobile electronic device 104 also includes a communications interface 132 interconnected with processor 108. Communications interface 132 allows mobile electronic device 104 to communicate with other computing devices via a link 136 and a network 140. Network 140 can include any suitable combination of wired and/or wireless networks, including but not limited to a Wide Area Network (WAN) such as the Internet, a Local Area Network (LAN), cell phone networks, WiFi networks, WiMax networks and the like. Link 136 is compatible with network 140. In particular, link 136 can be a wireless link based on any of the Global System for Mobile communications (GSM), General Packet Radio Service (GPRS), Enhanced Data rates for GSM Evolution (EDGE), third and fourth-generation mobile communication system (3G and 4G), Institute of Electrical and Electronic Engineers (IEEE) 802.11 (WiFi) or other wireless protocols or standards. Link 136 can also include any base stations and backhaul links necessary to connect mobile electronic device 104 to network 140.

Communications interface 132 is selected for compatibility with link 136 as well as with network 140. Communications interface 132 thus includes one or more transmitter/receiver assemblies, or radios, and associated circuitry. For example, communications interface 132 can include a first assembly, or radio, for enabling communications over a WiFi network, and a second radio for enabling communications over one or more mobile telephone networks (e.g. 3G networks).

The various components of mobile electronic device 104 are contained within a housing (not shown) comprising any suitable combination of materials (e.g. aluminum, plastics, and the like). The components of mobile electronic device 104 are interconnected via a communication bus (not shown). Mobile electronic device 104 can be powered by a battery (not shown) also contained within the housing, though it will be understood that mobile electronic device 104 can also be supplied with electricity by a wired connection to a wall outlet or other power source, for example when docked.

System 100 also includes a server 144, which can be based on any known server environment. Server 144 thus includes one or more processors such as a processor 148. Processor 148 is interconnected with a non-transitory computer-readable storage medium, such as a memory 152. Memory 152 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Server 144 also includes one or more communications interfaces, such as a communications interface 156, for interconnecting with network 140 via a link 160. In the present embodiment, link 160 is a wired link, and communications interface 156 is a network interface controller (NIC) which enables communications based on the Ethernet standard. It is contemplated, however, that link 160 can be any suitable combination of wired and wireless links, and that the nature of communications interface 156 can be varied according to the nature of link 160.

Server 144 can be managed by way of input and output devices (not shown) such as a keyboard, a mouse and a display. Such input and output devices can be co-located with server 144 and connected with processor 148 via local connections (e.g. Universal Serial Bus (USB)). In other embodiments, the input and output devices can be located at a terminal (not shown) remote from server 144 and connected to server 144 via network 140 and link 160. In some embodiments, both local input devices and a remote terminal can be present, and server 144 can be managed via either the local input devices or the remote terminal, as desired.

System 100 can also include additional computing devices, such as a personal computer 164. It is contemplated that such computing devices can include any number of mobile devices, servers and the like in addition to, or instead of, personal computer 164. Personal computer 164 is connected to network 140 via a link 168, which in the present example is a wired link (e.g. based on the Ethernet standard), but can also be a wireless link or a combination of wireless and wired links.

Mobile electronic device 104 can send and receive communications to and from other computing devices, including personal computer 164. Such communications can include messages such as email messages, Short Message Service (SMS) messages, Multimedia Messaging Service (MMS) messages, and the like. Server 144 is configured as a mail server which maintains a messaging account associated with mobile electronic device 104. In the examples discussed herein, the messaging account is an email account, though it is contemplated that the functionality described herein can also be applied to other types of messages.

In general, email messages received at server 144 and destined for mobile electronic device 104 are stored in a message database 172 in memory 152, then transmitted to mobile electronic device 104 for storage in a device message database 176 in memory 112. Databases 172 and 176 are also used to store messages sent (or to be sent) from mobile electronic device 104 to other computing devices, in addition to messages destined for mobile electronic device 104. It is contemplated that additional databases (not shown) can also be present at either or both of server 144 and mobile electronic device 104, such as databases for archiving messages from databases 172 and 176. For example, server 144 can maintain an additional database into which messages of a certain age and which have been read at mobile electronic device 104 are moved for archiving.

Mobile electronic device 104 also stores a messaging application 180 in memory 112 for carrying out various functionality in connection with the contents of database 176. Messaging application 180 comprises a plurality of computer-readable instructions which are executable by processor 108. Processor 108 is configured, via execution of the instructions in messaging application 180, to perform certain functions, as will be described in greater detail below.

Figure 2:
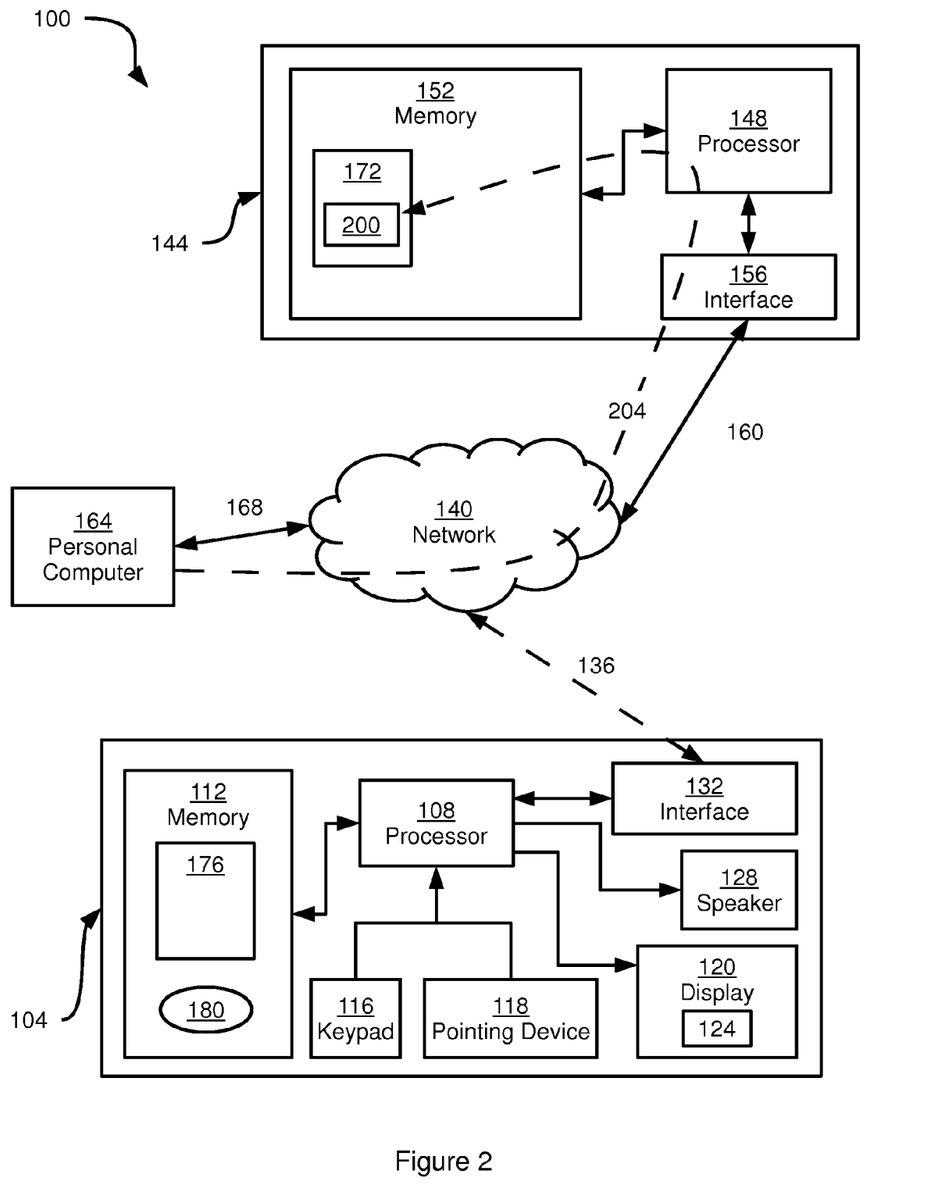
FIG. 2 depicts the transmission of a message to the server of FIG. 1, according to a non-limiting embodiment.

Thus, when personal computer 164 (or any other computing device) transmits an email message destined for mobile electronic device 104 (that is, with an email address associated with mobile electronic device 104 specified in the "to" field of the email), the email is transmitted to server 144 via link 168, network 140 and link 160. Server 144 stores the email in message database 172 in memory 152. The transmission of an email 200 and the storage thereof at server 144 is shown in FIG. 2 by path 204. Message database 172 is associated with mobile electronic device 104, and it is contemplated that server 144 can store a plurality of other message databases (not shown), each associated with a different mobile electronic device. In other examples, more than one message database can be associated with the same mobile electronic device (for example, when mobile electronic device 104 is associated with more than one email account).

Having received and stored email 200, server 144 can be configured to process rules (not shown) stored in memory 152 which can cause server 144 to apply certain labels, also referred to herein as "categories", to email 200 when email 200 meets certain preconfigured criteria. The nature of the rules processed by server 144 is not particularly limited. For example, server 144 can be configured to apply an "inbox" label to email 200 by default. As a further example, server 144 can be configured to remove (or simply to not apply) the inbox label from email 200 when email 200 is received from personal computer 164. In yet another example, server 144 can be configured to apply a "personal" label to any email received from a certain address. In general, email 200 and any other email in database 172 can be modified at server 144 to include any number of labels (including no (zero) labels). Each label applied to email 200 conveys information about email 200, such as its origin, its importance, its content and the like. Further discussion of labels will be provided below.

The rules stored and processed by server 144 for applying labels to the emails stored in database 172 can be received at server 144 from mobile electronic device 104, from the input and output devices used to manage server 144, or from any other computing device (following successful authentication of such a device as being authorized to modify the rules associated with database 172). Server 144 is configured to transmit email 200 to mobile electronic device 104 after applying or removing any necessary labels as a result of the processing of the rules mentioned above.

Figure 3:
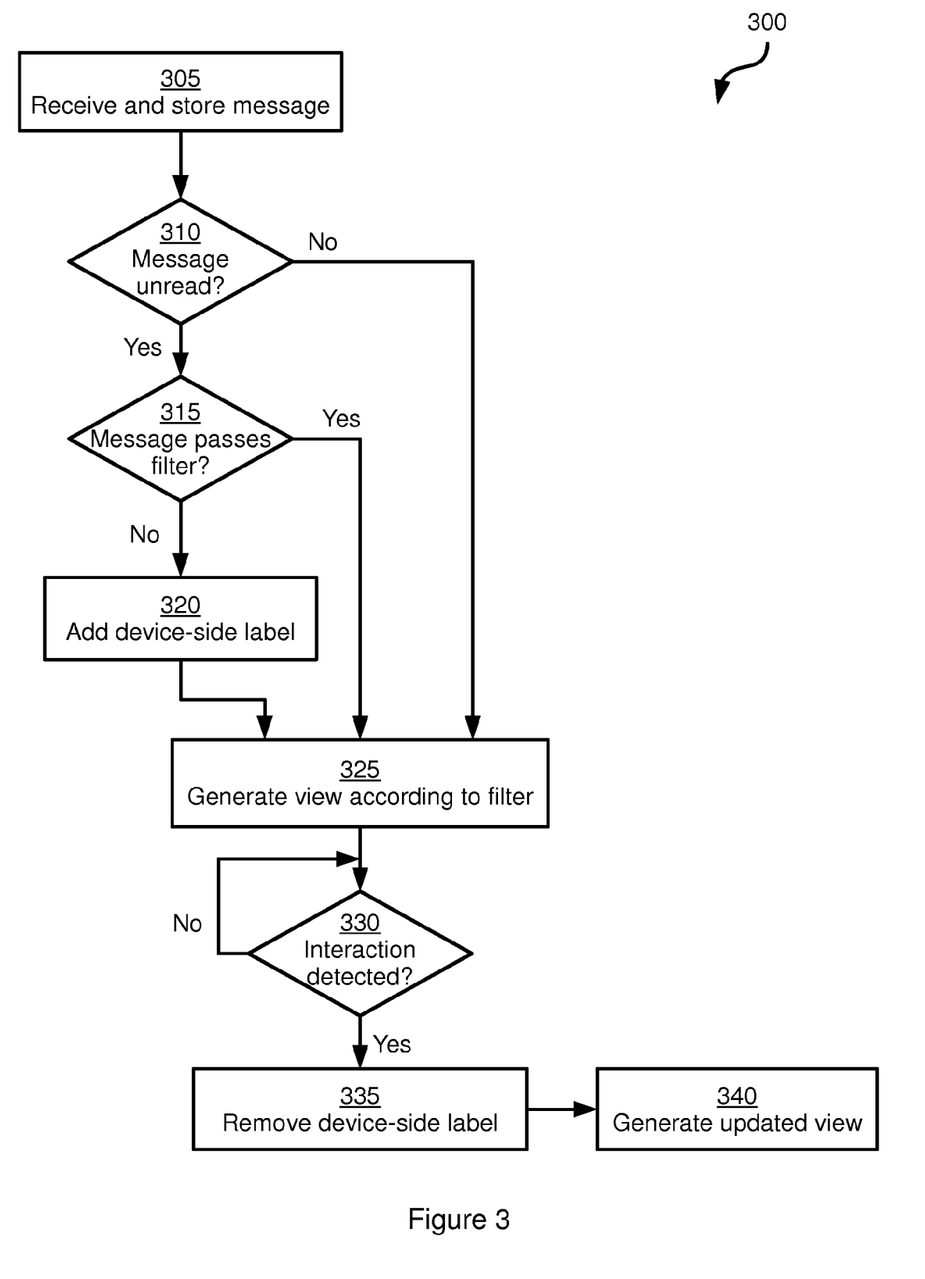
FIG. 3 depicts a method of managing messages in a mobile electronic device, according to a non-limiting embodiment.

Turning now to FIG. 3, a method 300 of managing messages at a mobile electronic device will be discussed in connection with its performance on mobile electronic device 104. In particular, method 300 is performed by mobile electronic device 104, and specifically by various components of mobile electronic device 104 under the control of processor 108, which executes messaging application 180. It is also contemplated, however, that method 300 and variants thereof could be performed by computing devices other than mobile computing device 104, and in systems other than system 100.

Figure 4:
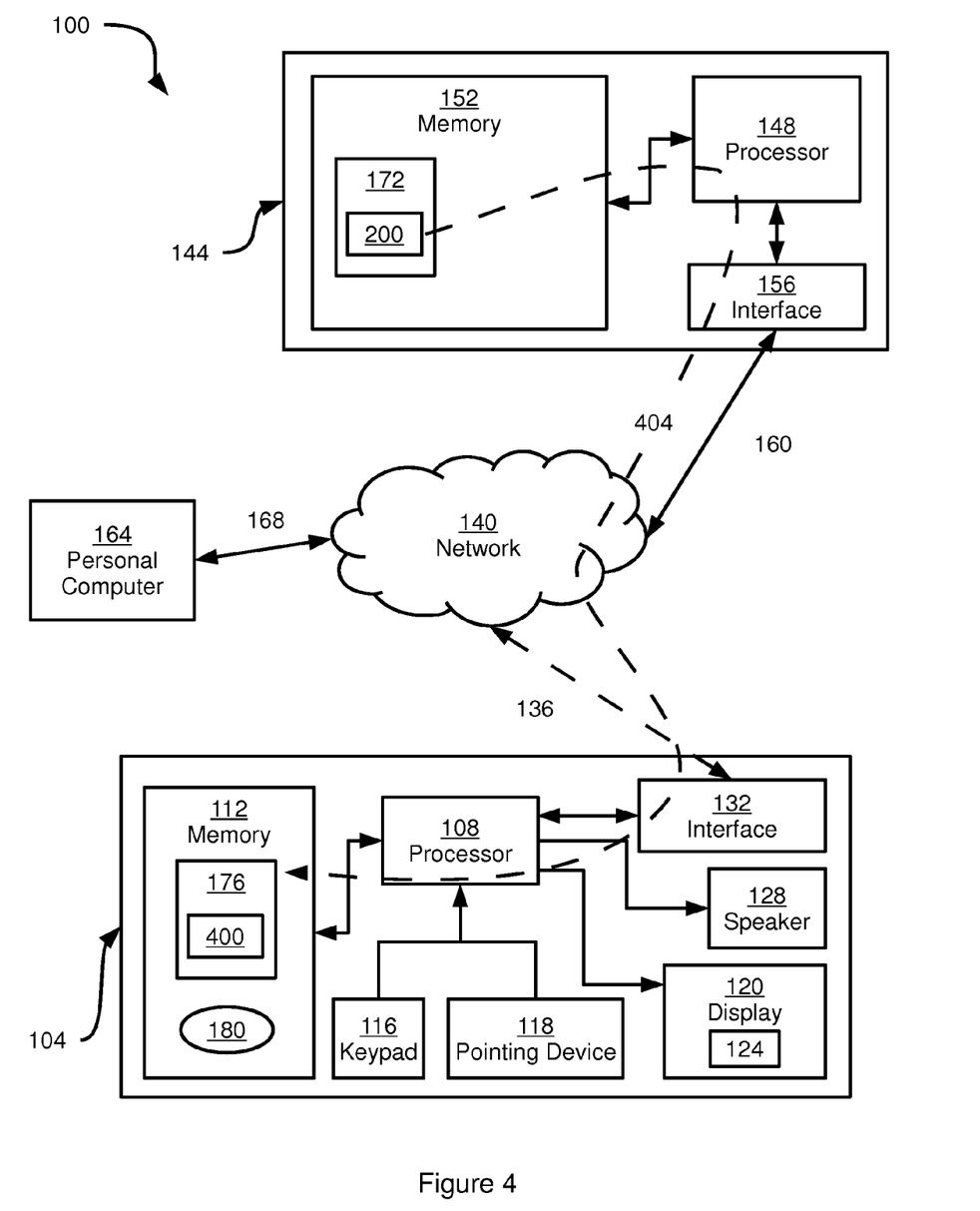
FIG. 4 depicts the transmission of the message of FIG. 2 to the mobile electronic device of FIG. 1, according to a non-limiting embodiment.

Beginning at block 305, mobile electronic device 104 is configured to receive a message. Server 144 is configured to transmit email 200 to mobile electronic device 104 after applying or removing any necessary labels as a result of the execution of the rules mentioned above. Turning to FIG. 4, email 200 is shown being transmitted, via path 404 which includes link 160, network 140, and link 136, from server 144 to mobile electronic device 104. Email 200 is received at communications interface 132, and a copy 400 of email 200 (copy 400 is also referred to as "email 400" herein) is stored in database 176 via processor 108. Copy 400 includes any labels applied by server 144. More generally, databases 172 and 176 are synchronized with one another, such that the contents of database 172 reflects the contents of database 176. The mechanism by which such synchronization occurs is not particularly limited. For example, server 144 can be configured to automatically transmit new emails to mobile electronic device 104 at configured time intervals. In other examples, mobile electronic device 104 can request new emails from server 144, either automatically or in response to input received at keypad 116 or pointing device 118. A combination of the above approaches can also be implemented.

Figure 5:
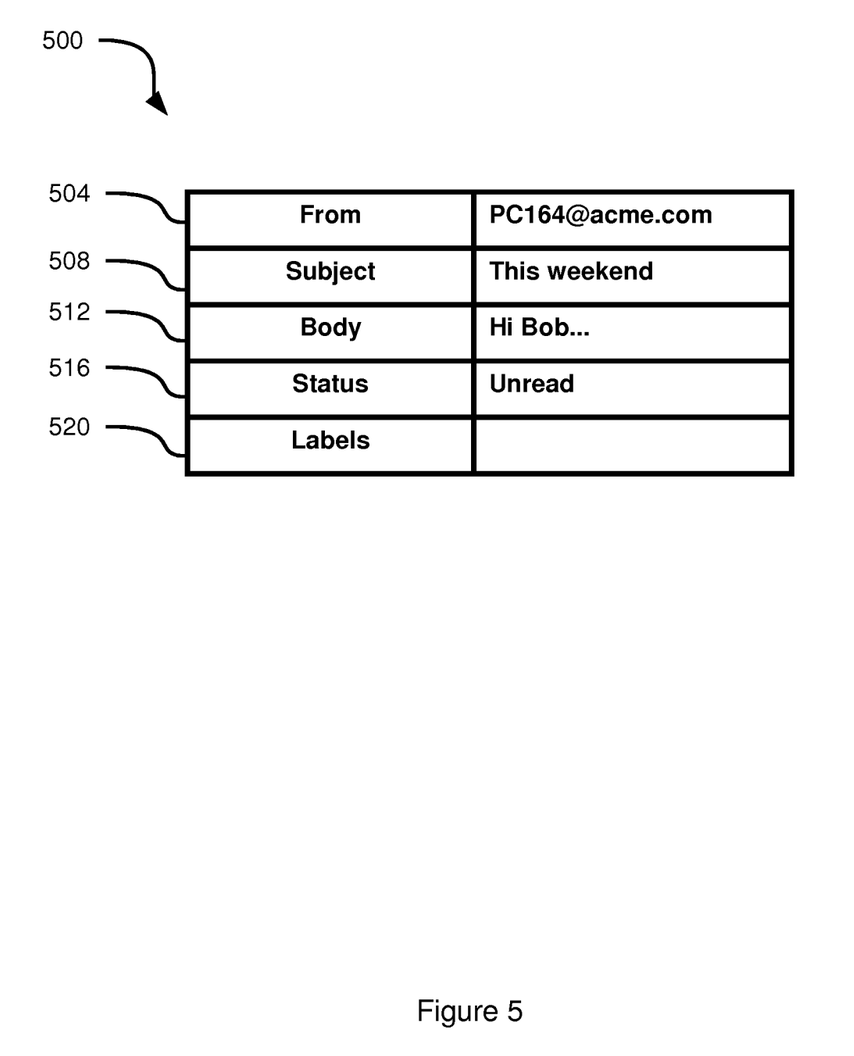
FIG. 5 depicts a record in a message database maintained by the mobile electronic device of FIG. 1, according to a non-limiting embodiment.

Turning to FIG. 5, email 400 is shown as stored in a record 500 of database 176. It is contemplated that database 176 can contain one record for each email stored therein, although only record 500 is shown for illustrative purposes. The structure of record 500 and of database 176 are not particularly limited, and the tabular format shown in FIG. 5 is provide purely as an example.

Record 500 includes various fields, each including a portion of the data that defines email 400. Record 500 thus includes an originator, or "from", address field 504 containing the address of the sender of email 400. Record 500 also includes a subject field 508, containing the subject line of email 300, as well as a body field 512, which contains the body of email 400 (which can include any suitable combination of text, images and the like. Record 500 additionally includes a status field 506, indicating whether email 300 is "read" or "unread" (that is, whether email 400 has been opened). In addition, record 500 includes a labels field 520, which stores any labels applied to email 200 at server 144 and therefore also present in email 400 at mobile electronic device 104.

As can be seen in FIG. 5, labels field 520 is empty. In the present example performance of method 300, server 144 was configured to process a rule which specifies that any emails received from personal computer 164 (or, more specifically, from an address associated with personal computer 164) are not to have any labels applied. Thus, server 144 removed any labels that may have been applied by personal computer 164, and did not apply the inbox label that would otherwise be applied by default.

Returning to FIG. 3, the performance of method 300 continues at block 310, at which processor 108 is configured to determine if the message received at block 305 is an unread message. Thus, processor 108 is configured to examine the status field 516 of record 500. When status field 516 contains an indication that email 400 is unread, as it does in FIG. 5, the determination at block 310 is affirmative. On the other hand, when status field 516 contains an indication that email 400 is not unread (that is, email 400 has been opened previously), the determination at block 310 is negative. It is contemplated that while the indication in status field 516 as shown in FIG. 5 is the word "unread", a variety of status indicators are contemplated. For example, a one-bit flag can be used, with "1" indicating unread and "0" indicating read. In other examples, the meanings of the flag could be reversed (that is, "0" could indicate unread). In still other examples, the presence of a numerical value or word could indicate that the message is unread, while the absence of any data in field 516 could indicate that the message is read.

When the determination at block 310 is negative, the performance of method 300 proceeds to block 325, which will be discussed in greater detail below. In the present example performance of method 300, however, field 516 of email 400 indicates that email 400 is indeed unread, and therefore the determination at block 310 is affirmative.

When processor 108 determines that email 400 is unread, the performance of method 300 proceeds to block 315. At block 315, processor 108 is configured to determine whether email 400 passes at least one filter criterion maintained in memory 112. The filter criterion is used by processor 108 in order to generate a primary message view at display 120. A more detailed discussion of message views will be provided below. Briefly, one of the functions implemented by mobile electronic device 104 during the execution of application 180 is the generation of a primary message view on display 120. Message views, as will be discussed in greater detail below, comprise a list of at least a portion of the emails in database 176. The primary message view can be the default message view generated on display 120 upon launching messaging application 180.

The filter criterion is used to determine which portion of the contents of database 176 will be used to generate the primary message view (that is, which messages will be listed on display 120 when messaging application 180 is launched). For example, the filter criterion can specify that only messages with the "inbox" label are to be selected for generating the primary message view. Thus, any message within database 176 that does not include the inbox label would fail to meet the filter criterion and would not be selected during the generation of the primary message view. Such messages would therefore not appear in the primary message view. It is contemplated that more than one filter criterion can also be used, and a wide variety of filter criteria are contemplated. In general, any given filter criterion can specify any label, or combination of labels, which must be present or absent in an email from database 176 in order for the email to be selected during the generation of a message view. The filter criterion (or criteria) can be implemented as one or more logical statements stored in memory 112, which evaluate to "true" or "false" values for each message in database 176. Thus, the performance of block 315 comprises evaluating the filter criterion for each message; the determination will be negative if the result of the evaluation is false, and affirmative if the result is true.

Continuing with the example performance of method 300, it will be assumed that the filter criterion specifies that in order to be included in a message view, an email must have the inbox label. In the present example, the filter criterion is a statement such as "LABELS includes INBOX". For email 400, which does not include the inbox label, the above statement (or any suitable equivalent statement) will evaluate to false, and the determination at block 315 will be negative. The performance of method 300 therefore proceeds to block 320. When the determination is affirmative, method 300 proceeds to block 325.

Figure 6:
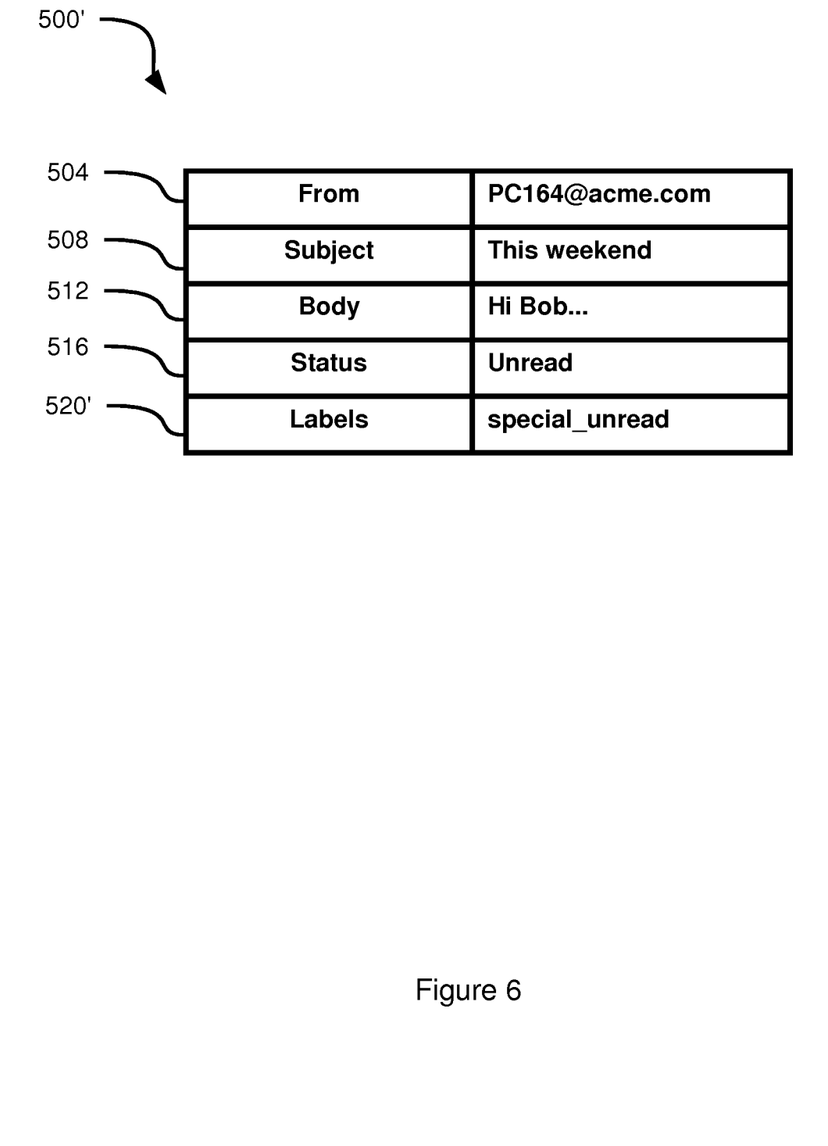
FIG. 6 depicts an updated version of the database record of FIG. 5, according to a non-limiting embodiment.

At block 320, having determined that unread email 400 which was received at block 305 does not meet the filter criterion for the primary message view, processor 108 is configured to modify email 400 by inserting a label into label field 520. In particular, the label added to label field 520 is a label that is specific to mobile electronic device 104 and thus is not synchronized with database 172 at server 144. The label is thus referred to as a "device-side label". Turning to FIG. 6, a modified version of record 500, indicated as 500', is shown following the performance of block 315. In particular, label field 520' now includes the device-side label "special_unread".

As can be seen in FIG. 6, the device-side label is maintained in labels field 520, and would therefore coexist with other labels if such labels were used. For example, for other emails the device-side label could be present in field 520 along with a "personal" label, a "interesting" label, and the like. The personal and interesting labels (or any other labels— the above-mentioned labels are purely exemplary) may have been applied either at server 144 or mobile electronic device 104, and are therefore transmitted between server 144 and mobile electronic device 104 during the above-mentioned synchronization process. Processor 108 is configured to recognize the special_unread label and any other device-side labels within field 520 as device-side labels, and to exclude them from any communications with server 144 related to synchronization. For example, a list of device-side labels may be stored in memory 112 which processor 108 is configured to examine during synchronization. In another example, processor 108 may be configured to recognize a characteristic (such as a particular string of text) within each device-side label.

Following the addition of the device-side label to email 400, the performance of method 300 proceeds to block 325, at which mobile electronic device 104 is configured to generate the primary message view. The performance of block 325 can be preceded by the receipt of an instruction at processor 108 to generate the primary message view. Such an instruction can be received in the form of input data from keypad 116.

Figure 7:
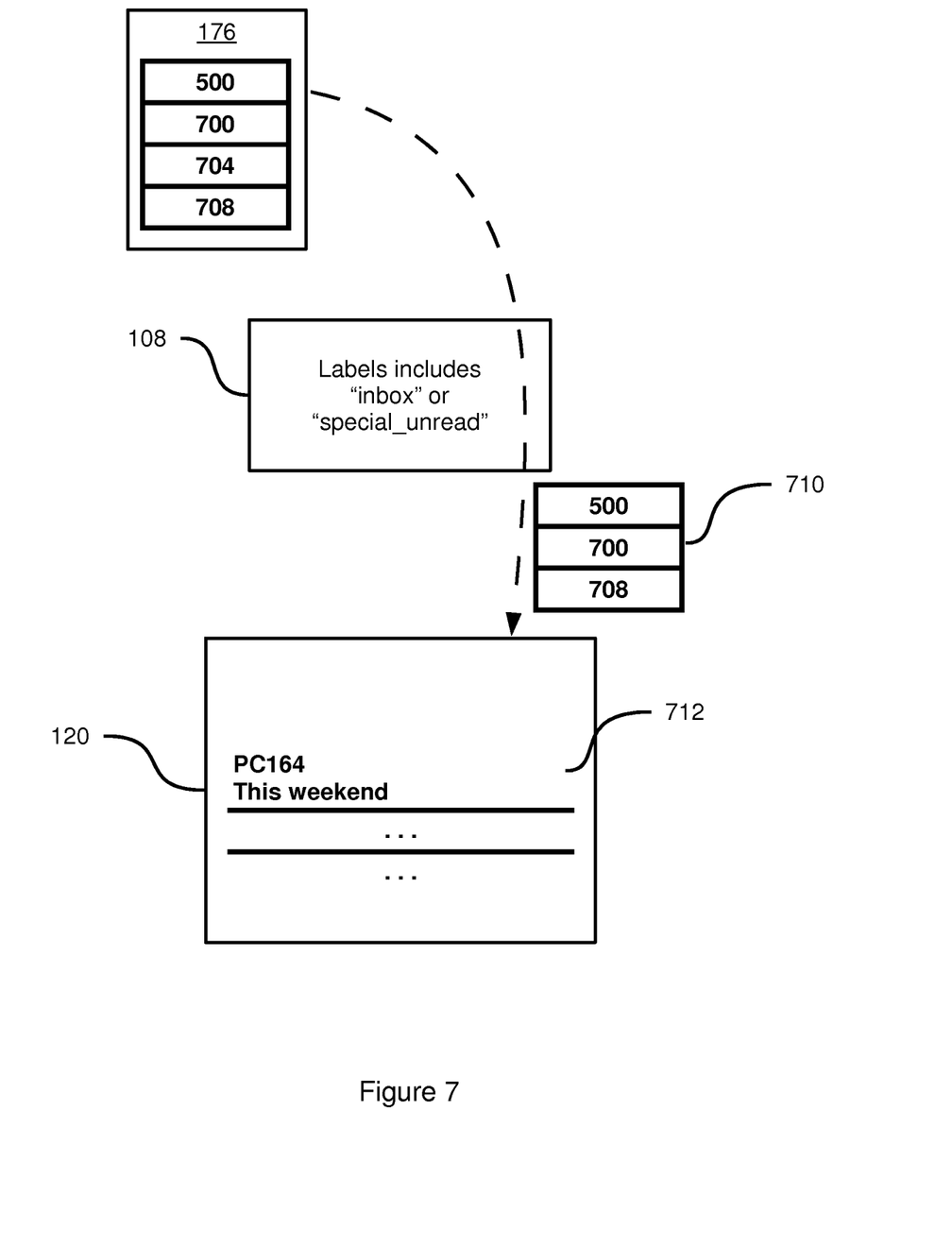
FIG. 7 depicts a performance of block 325 of FIG. 3, according to a non-limiting embodiment.

To perform block 325 of method 300, processor 108 is configured to evaluate the at least one filter criterion discussed above for each message in database 176, and to select all the messages for which the at least one filter criterion evaluates to true. Selection of a message comprises the transmission of at least a portion of the data defining the selected message from database 176 to display 120. Display 120, under the control of processor 108, generates a representation of the data received from processor 108. Turning to FIG. 7, a schematic depiction of the performance of block 325 is shown. In particular, record 500 (which defines email 400) as well as other example records 700, 704 and 708 defining other emails are shown in database 176. Processor 108 evaluates the at least one filter criterion for each record in database 176, and passes records 500, 700 and 708 (or portions thereof) to display 120 as a primary message view 710, which generates a representation 712 of the selected records. In particular, representation 712 includes the "from" address and the subject of the selected records, though a wide variety of other representations are also possible.

It is contemplated that the selected records in primary message view 710 may be too numerous to fit on display 120 simultaneously. In such cases, scrolling instructions received at processor 108 from an input device of mobile electronic device 104 can be used to control display 120 to update representation 712 to display different portions of primary message view 710.

As shown in FIG. 7, record 704 is not included in primary message view 710, as record 704 did not meet the at least one filter criterion. Also shown in FIG. 7 is an additional statement which forms part of the at least one filter criterion. In particular, the filter criterion evaluated by processor 108 includes a statement specifying that labels field 520 includes the device-side special_unread label. Thus, by evaluating the filter criterion, processor 108 is configured to select any message with the inbox label or with the device-side label for primary message view 710.

Returning to FIG. 3, the performance of method 300 continues at block 330. At block 330, processor 108 is configured to determine whether any interaction has been detected in connection with email 400. The nature of interactions detected at block 330 is not particularly limited, and includes an indication that email 400 has been opened (that is, read). Such an interaction can be detected by determining that the contents of status field 516 of record 500 has been updated to "read". An update to status field 516 can be caused by receipt of an instruction from an input device of mobile electronic device 104 for opening email 400, or during a synchronization process. For example, the corresponding status field in database 172 can be updated to read, thereby causing status field 516 to also update to read (this may happen if email 400 was read at a computing device (not shown) separate from mobile electronic device 104 but also associated with database 176).

Other examples of interactions include the receipt of instructions at processor 108 to create a reply message associated with email 400, or to forward email 400. Still another example of an interaction includes the application of one or more labels to email 400. Such label applications can also be received as instructions from input devices of mobile electronic device, or from server 144.

When no interaction is detected, the performance of method 300 can wait at block 330. It is contemplated that while waiting for an interaction to be detected in connection with email 400, the primary message view can be regenerated or updated, and that messaging application 180 can even be closed and reopened at a later time.

Figure 8:
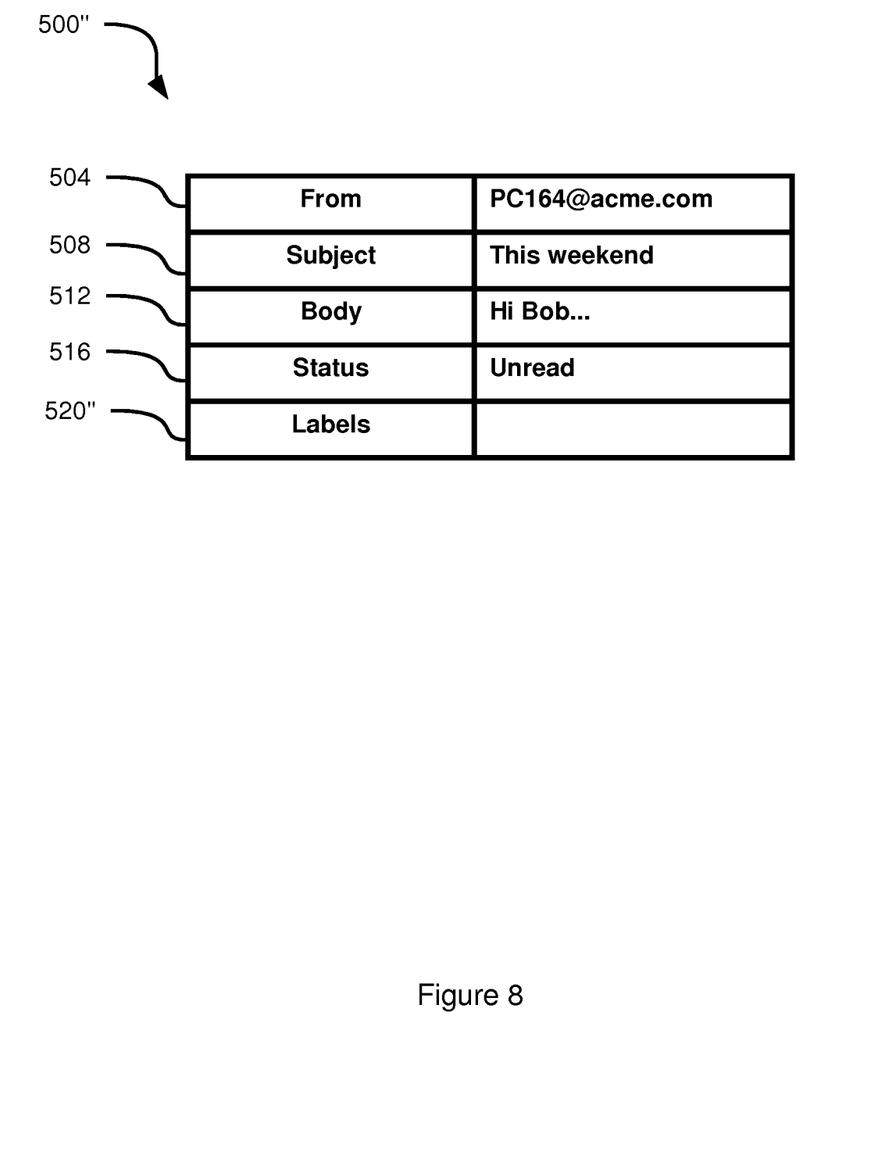
FIG. 8 depicts an updated version of the database record of FIG. 6 following the performance of block 335 of FIG. 3, according to a non-limiting embodiment.

When the determination at block 330 is affirmative—that is, when processor 108 determines that an interaction has occurred in connection with email 400—the performance of method 300 advances to block 335. At block 335, processor 108 is configured to automatically remove the device-side label that was applied at block 320 in response to detecting an interaction at block 330. Referring to FIG. 8, the result of the performance of block 335 is shown in the form of an updated version of record 500', indicated as 500". Record 500" includes updated labels field 520", from which the special-_unread label has been removed.

It will now be apparent that following the performance of block 335, email 400 will no longer be selected for a primary message view. Representations of email 400, and any other unselected emails, can still be represented on display 120 through secondary message views which are generated using one or more additional filtering criteria. However, they will not appear in the primary message view 710 which is the default message view generated during the execution of messaging application 180. Additional input must be received from input devices such as keypad 116 or pointing device 118, and additional computations must be performed by processor 108, in order to generate such secondary message views. Thus, the performance of method 300 proceeds from block 335 to block 340, at which an updated primary message view is generated. As discussed above, the updated primary message view will not include email 400, as email 400 no longer includes the device-side label.

Figure 9:
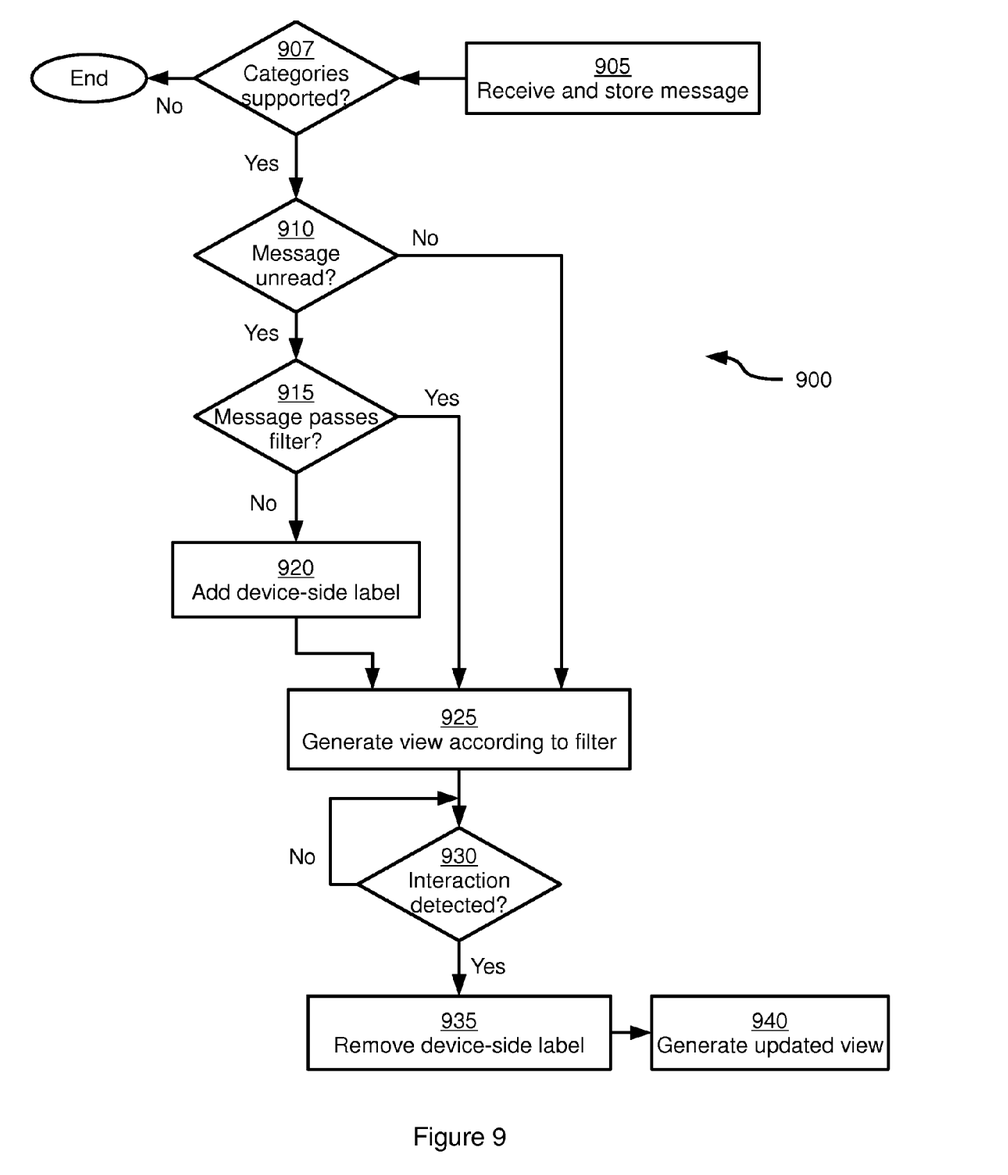
FIG. 9 depicts a method of managing messages in a mobile electronic device, according to another non-limiting embodiment.

Variations to method 300 are contemplated. For example, FIG. 9 shows another example of a method of managing messages. Blocks 905, 910, 915, 920, 925, 930, 935 and 940 of method 900 are as described above in connection with the corresponding blocks of method 300 (corresponding blocks being those with the same final two digits, but a leading '3' instead of a leading '9'). However, method 900 includes an additional block, 907, at which mobile electronic device 104 is configured to determine whether or not categories (i.e. labels) are supported by the messaging account in connection with which the message was received at block 905. Mobile electronic device 104 may include a plurality of message databases in memory 112, and some of those message databases may be associated with databases in server 144 (or other servers) which do not allow for the use of label fields such as label field 520. If the determination at block 907 is negative (that is, if the messaging account does not support categories), the performance of method 900 ends. Otherwise, the performance of method 900 continues to block 910.

Figure 10:
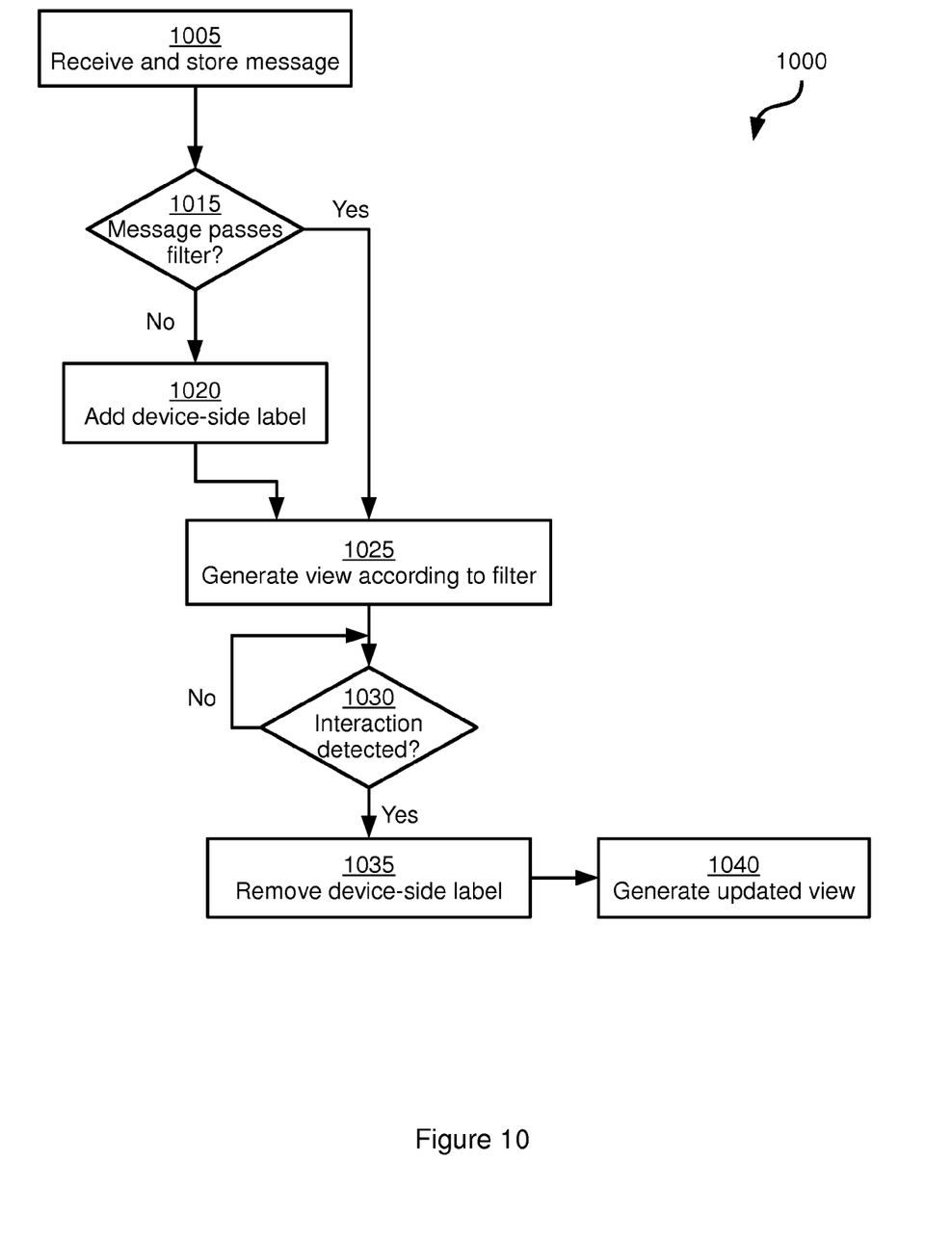
FIG. 10 depicts a method of managing messages in a mobile electronic device, according to a further non-limiting embodiment.

In other variations to method 300, the determination at block 310 can be omitted—that is, method 300 can be performed on any message received at mobile electronic device 104, regardless of its read or unread status. In such variations, an interaction detected at block 330 could nevertheless include an update to status field 516, as it is possible to mark messages as unread even after they have been marked read. This variation is shown in FIG. 10, in which blocks 1005, 1015, 1020, 1025, 1030, 1035 and 1040 of method 1000 are as discussed above in connection with the corresponding blocks of method 300. However, the determination as to whether or not the message received at block 1005 is unread is omitted in method 1000, and method 1000 instead proceeds directly to the determination of whether or not the email satisfies the filter criterion at block 1015.

It is also contemplated that labels can be applied to messages at mobile electronic device responsive to input data received at processor 108 from input devices such as keypad 116 and pointing device 118. Such input data can be representative of the selection of a label name from an interface generated on display 120. It is contemplated that the device-side label can be excluded from such interfaces, such that the device-side label is "hidden" and can only be applied and removed automatically by processor 108 through the performance of method 300.

It is further contemplated that method 300 and variations thereto can be implemented in connection with messaging accounts which make use of folder structures. For example, rather than (or in addition to) message database 176, mobile electronic device 104 can maintain a message store comprising a plurality of folders. Each message in such a message store can include a field which contains a single folder identifier which indicates the folder in which the message resides. Label field 520, and the functionality described herein in connection with method 300, can be implemented alongside the above-mentioned folder structure.

The methods and variations discussed above can be combined as desired. For example, method 300 could be modified to include a determination as in block 907, and to omit the determination at block 310 (as in method 1000).

Those skilled in the art will appreciate that in some embodiments, the functionality of messaging application 180 can be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of managing messages at a mobile electronic device, comprising:
    receiving a message and storing the message with other messages in a memory of the mobile electronic device;
    determining that a messaging account with which the message is associated supports labels;
    after determining that the messaging account supports labels, determining if the message is unread;
    after determining that the message is unread, determining, at a processor of the mobile electronic device, if the message passes at least one filter criterion maintained in the memory, the filter criterion being passed by messages having a first label or a device-side label, for use in generating a primary message view;
    when the message does not pass the filter criterion, adding the device-side label to the message;
    after adding the device-side label, generating, on a display of the mobile electronic device, the primary message view according to the filter criterion, the primary message view representing the message and ones of the other messages that pass the filter criterion;
    detecting an interaction with the message; and
    in response to detecting the interaction, automatically removing the device-side label from the message.

2. The method of claim 1, wherein the message is stored in a database in the memory, and wherein the database is synchronized with a server database.

3. The method of claim 2, wherein the device-side label is not transmitted to the server during synchronization.

4. The method of claim 1, wherein generating the primary message view comprises:
    for each message in the memory, evaluating the filter criterion;
    selecting each message which passes the filter criterion; and
    transmitting at least a portion of the data defining the selected messages to a display of the mobile electronic device.

5. The method of claim 1, wherein detecting an interaction comprises detecting one or more of an update to the status of the message, an instruction to create a reply to the message, an instruction to forward the message, and an instruction to apply a label to the message.

6. The method of claim 5, wherein the instructions comprise input data received from one or more input devices of the mobile electronic device.

7. A mobile electronic device, comprising:
    a communications interface for receiving a message;
    a memory interconnected with the communications interface for storing the message and other messages;
    a processor interconnected with the communications interface and the memory, the processor configured to determine that a messaging account with which the message is associated supports labels, and after determining that the messaging account supports labels, to determine if the message is unread;
    the processor further configured, after determining that the message is unread, to determine if the message passes at least one filter criterion maintained in the memory, the filter criterion being passed by messages having a first label or a device-side label, for use in generating a primary message view on a display of the mobile electronic device;
    the processor further configured, when the message does not pass the filter criterion, to add the device-side label to the message;
    the processor further configured to control the display, after adding the device-side label, for generating the primary message view according to the filter criterion, the primary message view representing the message and ones of the other messages that pass the filter criterion;
    the processor further configured to detect an interaction with the message; and,
    in response to detecting the interaction, to automatically remove the device-side label from the message.

8. The mobile electronic device of claim 7, wherein the message is stored in a database in the memory, and wherein the database is synchronized with a server database.

9. The mobile electronic device of claim 8, wherein the device-side label is not transmitted to the server during synchronization.

10. The mobile electronic device of claim 7, the processor configured to control the display for generating the primary message view by:
    for each message in the memory, evaluating the filter criterion;
    selecting each message which passes the filter criterion; and
    transmitting at least a portion of the data defining the selected messages to the display.

11. The mobile electronic device of claim 7, the processor configured to detect an interaction by detecting one or more of an update to the status of the message, an instruction to create a reply to the message, an instruction to forward the message, and an instruction to apply a label to the message.

12. The mobile electronic device of claim 11, further comprising one or more input devices, wherein the instructions comprise input data received from the one or more input devices.

13. A non-transitory computer-readable medium for storing computer-readable instructions executable by a processor of a mobile electronic device, the instructions for causing the computing device to perform a method comprising:
    receiving a message and storing the message with other messages in a memory of the mobile electronic device;
    determining that a messaging account with which the message is associated supports labels;
    after determining that the messaging account supports labels, determining if the message is unread;

after determining that the message is unread, determining, at a processor of the mobile electronic device, if the message passes at least one filter criterion maintained in the memory, the filter criterion being passed by messages having a first label or a device-side label, for use in generating a primary message view;

when the message does not pass the filter criterion, adding the device-side label to the message;

after adding the device-side label, generating, on a display of the mobile electronic device, the primary message view according to the filter criterion, the primary message view representing the message and ones of the other messages that pass the filter criterion;

detecting an interaction with the message; and in response to detecting the interaction, automatically removing the device-side label from the message.

14. The non-transitory computer-readable medium of claim 13, wherein the message is stored in a database in the memory, and wherein the database is synchronized with a server database.

15. The non-transitory computer-readable medium of claim 14, wherein the device-side label is not transmitted to the server during synchronization.

16. The non-transitory computer-readable medium of claim 13, wherein generating the primary message view comprises:

for each message in the memory, evaluating the filter criterion;

selecting each message which passes the filter criterion; and transmitting at least a portion of the data defining the selected messages to a display of the mobile electronic device.

17. The non-transitory computer-readable medium of claim 13, wherein detecting an interaction comprises detecting one or more of an update to the status of the message, an instruction to create a reply to the message, an instruction to forward the message, and an instruction to apply a label to the message.

\* \* \* \* \*